(12) United States Patent
Gerlach

(10) Patent No.: US 12,018,734 B2
(45) Date of Patent: Jun. 25, 2024

(54) LINK PLATE OF A PIN, BUSH, OR ROLLER CHAIN

(71) Applicant: Rexnord Kette GmbH, Betzdorf (DE)

(72) Inventor: Ulrich Gerlach, Troisdorf (DE)

(73) Assignee: REXNORD KETTE GMBH, Betzdorf (DE)

( * ) Notice: Subject to any disclaimer, the term of this patent is extended or adjusted under 35 U.S.C. 154(b) by 834 days.

(21) Appl. No.: 17/004,521

(22) Filed: Aug. 27, 2020

(65) Prior Publication Data

US 2021/0396298 A1 Dec. 23, 2021

(30) Foreign Application Priority Data

Jun. 17, 2020 (DE) ...................... 10 2020 003 601.5

(51) Int. Cl.
*F16G 15/12* (2006.01)

(52) U.S. Cl.
CPC .................... *F16G 15/12* (2013.01)

(58) Field of Classification Search
CPC .......... F16G 13/06; F16G 13/02; F16G 15/12
See application file for complete search history.

(56) References Cited

U.S. PATENT DOCUMENTS

| 2016/0348755 A1 | 12/2016 | Ritz et al. |
| 2020/0191241 A1 | 6/2020 | Dos Santos et al. |
| 2021/0396298 A1* | 12/2021 | Gerlach ................. F16G 13/06 |

FOREIGN PATENT DOCUMENTS

| DE | 10 2008 004 595 A1 | 7/2009 |
| DE | 10 2016 009 814 A1 | 3/2017 |
| DE | 20 2018 101 379 U1 | 3/2018 |
| DE | 202018101379 U1 * | 4/2018 |

OTHER PUBLICATIONS

Translation of DE-202018101379 (Year: 2018).*

* cited by examiner

*Primary Examiner* — Bobby Yeonjin Kim
(74) *Attorney, Agent, or Firm* — Howard IP Law Group, PC

(57) ABSTRACT

A link plate of a pin, bush, or roller chain, the link plate having two through-holes for one pin each, and wherein the through-holes are formed between two link plate base areas, and wherein a distance-indicating marker is applied to at least one base area.

12 Claims, 2 Drawing Sheets

LINK PLATE OF A PIN, BUSH, OR ROLLER CHAIN

FIELD OF INVENTION

The invention relates to a link plate of a pin, bush, or roller chain; a pin, bush, or roller chain; an application of a link plate of a pin, bush, or roller chain; as well as a method for determining wear of a pin, bush, or roller chain.

BACKGROUND

Regarding pin, bush, or roller chains, it is known that such chains can wear out in use. This is particularly evident in that the chains lengthen and must be considered worn once beyond a certain extent of elongation. The wear is mainly caused by abrasive wear in the chain joint due to rotational movement of the chain joint, which leads to an increase in the clearance of the joint and an associated change of the chain length. A change in the chain pitch is associated with this.

Measuring gauges for such chains with which the wear, or elongation, of the chain can be determined are established. For this, the measuring gauge can be placed on the outside of the chain and a measurement taken and/or a feeler gauge can be inserted into an intermediate space of the chain, while it is checked whether another feeler gauge can also be inserted into another intermediate space of the chain.

Although the wear of the chain can be determined reliably with the gauges that are applied to the outside of such chains, it has been found that several steps are required to determine the possible elongation, or wear, of the chain.

SUMMARY

The purpose is to create a way to detect chain wear that is simpler, more manageable, and/or involves fewer components, particularly without special measuring or testing devices.

The purpose is achieved by the subjects of the independent claims. Advantageous embodiments are the subject of the respective dependent claims and the description.

The central idea of the invention is to apply a marker to the chain itself, that is, to at least one of the link plates, which indicates a distance in the sense of an elongation. By means of the marker, it can be determined whether the chain has elongated beyond a certain extent, which is, for example, indicated directly by the marker. In this way, a marker can be provided on at least one of the link plates of a chain, which allows a conclusion to be drawn about wear, or elongation, of the chain. Thus, a marker that allows observation with the naked eye is used advantageously. It was recognized in the context of the invention, for the first time ever, to provide a marker on a link plate of the chain itself, which indicates a distance that is fundamental to the wear, or elongation, of the chain. In doing so, the marker on one link plate can interact with a (geometric) embodiment of at least one other link plate during observation. The operator, or user, can be enabled to relate the marker with respect to the location and/or position of a subsequent adjacent link plate. By means of the marker, a distance between two chain links can be determined with respect to the marker. It can be stipulated that the marker indicates, or specifies, a distance that is still tolerable in terms of wear; the chain can still be used until this distance is reached. If the distance indicated by the marker is further increased to an extent greater than the marker, then the chain must be replaced.

The invention establishes a link plate of a pin, bush, or roller chain, wherein the link plate has two through-holes for one pin each and the through-holes are formed between two link plate base areas. The link plate exhibits a marker, applied to at least one base area, that indicates a distance.

In the sense of the description, the term "pin, bush, or roller chain" comprises a one-dimensionally movable chain, commonly referred to as roller chain or articulated chain. Where in the description a pin, bush, or roller chain is intended, the term "chain" is also used for simplification.

In the sense of the description, the term "pin chain" comprises an articulated chain in which link plates rotate on pins, which may be riveted or cotter- or split-pinned. In the case of a pin chain, it can in particular be a gall chain, leaf chain or tooth chain. In the case of a leaf chain, the articulated chain consists only of link plates and pins. Such leaf chains can particularly be used as lifting chains for cranes and hoists.

In the sense of the description, the term "bush chain" or, synonymously, "bushed roller chain" comprises an articulated chain in which the inner link plates sit on a bush or sleeve that is located on the pin. The outer link plates sit directly on the pin. Due to the joint in the form of a bushing or sleeve, friction and wear are reduced.

In the sense of the description, the term "roller chain" comprises an articulated chain in which the inner link plates sit on a sleeve, called a bush or bushing, on the pin. The outer link plates sit directly on the pin. Between the inner link plates, there is a roller on the bushing. The roller located on the bushing reduces wear of the chain and chain sprocket.

The link plate of a chain or the chain further developed in the context of the description by means of the invention are thus related to one-dimensionally movable chains, that is, articulated chains with link plates and pins, whereby the articulated chains may differ according to the type of connection between the chain links.

In the sense of the description, the term "link plate" comprises a flat piece of material, in particular made of metal, wherein the link plate has at least two, particularly preferably exactly two, through-holes for a pin or for a bushing, also called a sleeve. The through-holes are formed between the two link plate base areas, that is, the large areas of the flat piece of material. The geometry of the link plate is defined in particular with regard to the pitch (distance between the centers of the through-holes for the pins of a link plate) and the diameter of the through-holes for the pins.

As a result of wear, the distance between the centers of the through-holes of a link plate can increase by, among other causes, modification of the embodiment of the through-holes from the "new condition," or the "delivered" condition, which occurs in particular with a deformation of a through-hole with an elongation in the direction of the adjacent border area of the link plate. The through-hole of a link plate in a chain can thus be elongated in the direction of the adjacent chain link. With increasing use of the chain, the through-hole to the border area of the link plate elongates, that is, the diameter, or the width of the through-hole, increases along the centerline of the link plate. As a result of this increase in diameter along the central axis of the link plate, wear with an elongation of the chain occurs, which is called wear elongation. Typically, articulated chains are replaced after reaching a specified wear elongation. Generally, articulated chains with an elongation due to wear of 3 percent compared to the nominal length are considered to be worn to such an extent that failure-free and safe operation can no longer be guaranteed. In particular cases, a lesser elongation may also be specified as the acceptable elongation.

The term "marker" in the sense of the description comprises the provision of at least one reference point that has a macroscopic dimension in order to be detected by the naked eye. The marker may in particular be a change in the surface of the base area of the link plate, which is in particular permanently exhibited and/or applied to the surface of the base area of the link plate. Provided that the exhibition or application of a marker on the base area of the link plate is spoken of, this means hereunder in particular that the surface of the base area itself can be changed or modified to create the marker. A marker on the link plate can indeed be applied to the surface of the base area by means of additional material, particularly in the form of paint, but the marker is preferentially formed by means of a change in the surface of the base area of the link plate in comparison with the unaltered surface of the base area of the link plate. A marker can take the form of, for example, a dash, a line, or a curve. In the sense of the description, the term "marker" comprises any geometric embodiment or shape. In addition to a punctiform embodiment and a line-shaped embodiment of a marker, other markers are also possible, especially closed traverses.

In the sense of the description, the term "distance-indicating" marker means that the marker indicates a distance associated with the change that the chain undergoes as a result of the operating hours to which the chain is subjected, which leads to an (increasing) distance between the link plate that bears the marker and an adjacent link plate. The marker indicates a distance, attributed to the elongation of the chain as related to the link plate, due to increasing operating hours, within which the chain is not yet considered "worn." By means of the marker, a distance can be determined and read with the naked eye. The distance indicated on the link plate can indicate the wear, in particular in conjunction with an adjacent link plate. The distance-indicating marker can indicate a distance to one or both of the adjacent link plates up to which the chain has not yet been subjected to such wear that it would have to be replaced. The marker can thus advantageously and in particular indicate a distance of the pins, or a distance of the centers of the through-holes, or a distance of the centers of the circular through-holes, from the delivered status up to a distance at which the chain is taken to be worn, or in need of replacement. In particular, the marker can indicate a distance, or a change in the location, of a pin, that is attributed to the distance the pin in the through-hole takes up between the "new condition" and the "worn" condition. In the sense of the description, the term "distance" therefore comprises not only a distance that can be "measured" between two marker points, but also a distance that results from increased operating time of the chain due to wear, or elongation, of the chain. The marker can thus be embodied in accordance with two alternatives, of which hybrid forms are possible. For example, in accordance with a first alternative, the marker can be embodied in such a way that the marker includes a reference point for the new condition and a marker for the worn condition. In accordance with the second alternative, the marker can indicate (only) a distance, or elongation, from which the chain is considered worn.

The distance-indicating marker can essentially have at least one reference point that indicates a condition from which the chain can be considered worn, or in need of replacement. The distance refers to an elongation of the chain relative to the link plate, from which the chain can be considered worn. The marker thus corresponds to a condition that relates to a distance, or an elongation, that has increased compared to the delivered, new condition of the chain, to such an extent that the chain has reached its end of life range. The distance indicated by the marker can thus fundamentally relate the distance of the pins, which increases with increasing wear, or increasing elongation, of the chain. Even though the distance is not necessarily quantifiable by means of the marker, the marker indicates that a distance specified, or predetermined, by means of the marker has been reached. In the sense of the description, the marker thus comprises at least one reference point which, in comparison with the location of another chain element of the chain, particularly a subsequent adjacent link plate, allows conclusions to be drawn about the wear, or elongation, of the chain.

The distance-indicating marker thus comprises at least one reference point in the sense of the description that can be compared to the outer contour of an outer link plate, in particular with the position and/or location of the outer contour of a subsequent adjacent link plate, particularly when the marker is applied to an inner link plate. It can thus be stipulated that the marker is applied to the link plate against the outer contour of the subsequent link plate in such a way that the marker becomes visible upon an elongation of the chain, or after a certain degree of wear of the chain.

The link plate may exhibit a marker for a distance that can relate itself to a pin or an adjacent outer link plate. However, the link plate can also exhibit more than one marker so that a further distance can be related, in particular a distance to another pin or the other adjacent outer link plate.

The link plate exhibiting the marker is embodied particularly as an inner link plate that indicates with the marker the distance of a pin from the "new condition" to the "worn" condition, or the elongation of the chain as related to the inner link plate from the "new condition" to the "worn" condition. The link plate with the marker, embodied as an inner link plate, thus indicates the distance that at least one adjacent outer link plate can take up between "new condition" and "worn" condition.

The term "distance" is thus not necessarily to be seen as a quantifiable distance from the marker in the form of a concrete length—but which can well be the case in forms of embodiment—but also in the specification of a position/location of at least one adjacent link plate that is still tolerable for operation, or of another tolerable elongation that occurs in the chain with increasing operating hours.

The marker can exhibit at least one section spanning the longitudinal dimension of the link plate. This section may (initially) have no function with regard to the distance that the marker should indicate, but it can facilitate taking a reading with the naked eye in which the operator, or user, can detect a complete form on the link plate which, even after the chain has been in operation for several hours, can be fully detected and assembled in such a way that a location and/or position of an adjacent link plate, particularly in relation to the outer points in the longitudinal direction of the link plate, which are the reference points for the position of the other link plate, can effortlessly have its position detected and compared with the position of the subsequent link plate.

A complete form with sections along the longitudinal dimension of the link plate can thus offer an advantage. The marker that exhibits at least one section that can extend along the longitudinal dimension of the link plate can be, for example, a circular shape, an ellipse, a (rounded) rectangle, or any other form that has a common shape that the operator, or user, can immediately recognize.

If the marker is only applied to one base area of the link plate, it must be ensured upon installation of the chain that the marker is outwardly visible to the user, or operator. Particularly in the case of a link plate where a marker is applied to only one base area, attention must be paid upon installation of the chain that this base area is oriented with the marker facing outwards to make the marker visible from the outside. To simplify the installation, the link plate can exhibit a distance-indicating marker on both base areas, which is applied to the base area.

In a preferred embodiment, the marker is embodied as an elevation and/or depression on the base area. In particular, the marker can be a depression introduced to the base area, which can be formed, for example, by etching, laser, milling, turning, spark erosion, embossing, or by other, especially mechanical, methods. In the sense of the description, a marker is preferably a marker arranged on the base area which, at least in sections, exhibits a length transverse to the longitudinal axis of the link plate, that is, essentially transverse to the connecting line of the through-holes. In particular, the marker can be designed in the form of a dash or a line transverse to the longitudinal axis of the link plate. The marker can have a width of 1 mm to 5 mm. Preferably, the marker can have a width of 1 mm to 4 mm, and more preferably, 2 mm to 3 mm.

The depression can be formed as an indentation in the base area of the link plate. The depression can be formed at least in sections along its length symmetrically to its bottom, that is, the lowest point with respect to the base area of the link plate. It is possible for the depression to have an asymmetry with respect to the bottom of the depression at least in sections. Although a projection is also possible, for example in the form of a material for the marker that is the same or differing material from the link plate, it presents the disadvantage that the marker itself can wear off as a result of erosion, which can make it difficult to read or make comparisons with the marker with increased operating life of the chain.

A marker embodied as a depression yields a direct inventive advantage, since a dimension indicating the distance between the pins from which wear of the chain can no longer be accepted or tolerated can be indicated on the chain itself. However, a marker embodied as a depression for indicating wear of the chain is at first nonsensical, as a depression has been regarded as an embodiment that weakens the integrity of the chain. It is thanks to the invention that a marker—just embodied as a depression—can be provided to make the wear of a chain visible to the naked eye without leading to a weakening of the chain—which could be assumed by experts until now. It was indeed recognized that a marker embodied as a depression can cause a "weakening" of the material of the link plate, but the alleged weakening provides a critical advantage with which, notably, the wear of the chain, or an elongation of the chain links beyond a predetermined extent, which has not yet been reached as long as the marker can be detected and/or as soon as the marker is detected, can be intercepted.

A mark embodied as a depression may exhibit a depth that is less than 5 mm, preferably less than 4 mm, preferably less than 3 mm, particularly preferably less than 2 mm, especially preferably less than 1 mm. Markers designed as indentations can have a depth that can essentially be in the range of 0.1 mm to 1 mm, preferably in the range of 4 to 8 percent of the link plate thickness. If a marker is designed as a depression, it is particularly preferred that it exhibit rounded edges.

In a preferred embodiment, the marker indicates a length on the base area with regard to the distance in the longitudinal dimension, that is, in the direction in which the elongation, or wear, of the chain is expected. The marker can exhibit at least two reference points, between which there a distance presented from which the chain is taken to be worn. The link plate can thus have a marker that includes a reference point for the new condition as well as a reference point for the wear. The distance between the reference points, which is established between the new condition and the condition associated with a worn chain, can be specified.

In a preferred embodiment, the link plate exhibits a necking, and the marker exhibits at least two points on opposing sides of the necking. Through this, an elongation, or wear, in regard to the distance, can be detected in relation to both bushings, or both subsequent link plates contacting the link plate. The increasing distance in relation to the two subsequent link plates, which are contacting the link plate by the respective pins, can be detected on the one link plate. On one and the same link plate, the elongations that result in relation to the two pins that serve as connection to the other link plates are factored. The consideration of both pins on one link plate leads to an improvement of the information, or to an assessment of all possible information, that can be offered in relation to the elongation of a link plate.

In a preferred form of design, the marker forms a closed geometrical shape, which can improve the detection of deviations or the detection of a materializing location/position of adjacent link plates.

The invention also establishes a pin, bush, or roller chain with inner and outer link plates wherein at least one link plate is designed per specification, and the marker is oriented outward. This way, a user, or operator can easily view the marker from the side of the chain and draw conclusions about the wear of the chain. Preferably, the applicable link plate of the chain is an inner link plate. In a preferred form of design, the chain has several link plates that exhibit a marker in the sense of the description, so that the wear is not only detectable on one link plate of the chain, but on several. By providing several link plates that exhibit a marker on a chain, a means of wear can be recognized by the operator, or user, and not just selective perception. It is possible, for example, that the inner link plates of the chain visible from the outside all exhibit a marker. Alternatively, it is possible that every second, every third, etc. inner link plate exhibits a marker. An irregular provision of inner link plates exhibiting a marker is possible as well.

In a preferred embodiment of the pin, bush, or roller chain, the marker is visible depending on the wear of the pin, bush, or roller chain. It can thereby be accomplished, for example, that the marker is not visible in the delivered condition of the chain and then first becomes visible when wear of the chain suggesting replacement of the chain occurs. In this respect, the marker can be understood as a warning to the operator, or user, in that the visual emergence of a marker due to the elongation of the chain is a warning notice to the user, or operator. The marker can thus be understood nominally as binary information, that, upon a visual emergence, indicates that the chain is to be replaced. It is also possible that the marker exhibits other formations that are already visible in the delivered condition. In this respect, the marker can be designed as described in the specification.

The invention also establishes the use of a link plate of a pin, bush, or roller chain having two through-holes for one pin each, wherein the through-holes are formed between two link plate base areas. A distance-indicating marker, applied to at least one base area, is used.

The invention also establishes an embodiment—which alone constitutes an invention—as per which the marker is used for the assembly of the pin, bush, or roller chain. The marker can be detected by image recognition software during assembly. Through this, the location of the marker is checked by optical control units when feeding the link plate to the assembly unit, and incorrectly fed link plates are removed from the feeding system.

The invention also establishes a method for detecting wear of a pin, bush, or roller chain having link plates with two through-holes for one pin each. The through-holes are formed between two link plate base areas. At least one of the link plates is furnished as a link plate having a distance-indicating marker, which is applied to at least one base area. A user, or operator, can detect wear of the chain by observation of the marker. Additionally, the user, or operator can in particular set the position of a subsequent link plate with respect to the marker of the link plate with the marker.

The description of the individual aspects of the invention in the form of the link plate, pin, bush, or roller chain, the use of a link plate, and the method of detecting or determining wear of a pin, bush, or roller chain are to be regarded as complementary to one another. Statements in the description pertaining to one of the aspects also pertain to an embodiment apropos of another one of the aspects. In particular, the statements pertaining to the link plate apply to each of the other aspects.

It is possible, particularly for the embodiment of a chain, that the markers on the link plates of the chain can be embodied differently. Different markers can be combined. However, to simplify the production of a chain, the link plates can also all exhibit the same marker.

In the sense of the description, the naming of a numerical value comprises not only the actual numerical value, but also—in order to include particular manufacturing tolerances—a range around the concrete numerical value, which can be +/−15%, preferably +/−10%, of the stated numerical value.

In the sense of the description, the term "exhibit" comprises both the inherent meaning of the term, that further elements can be provided in addition to the elements stipulated (non-exhaustive list), as well as the meaning that the term "exhibit" is used synonymously with "consist of" or "formed from".

In the sense of the description, the term "at least one" includes the provision of exactly one element, or entity, that follows the term "at least one", but also two, three, four or accordingly more elements, or entities, can be provided. The term "at least one" does not exclude, but also does not require, that all elements, or entities, must be formed equally if more than one, or one, is present.

BRIEF DESCRIPTION OF DRAWINGS

The invention is more closely exemplified hereafter by means of the example embodiment shown in the figures.

In the drawings are shown.

DETAILED DESCRIPTION

Figure 1:
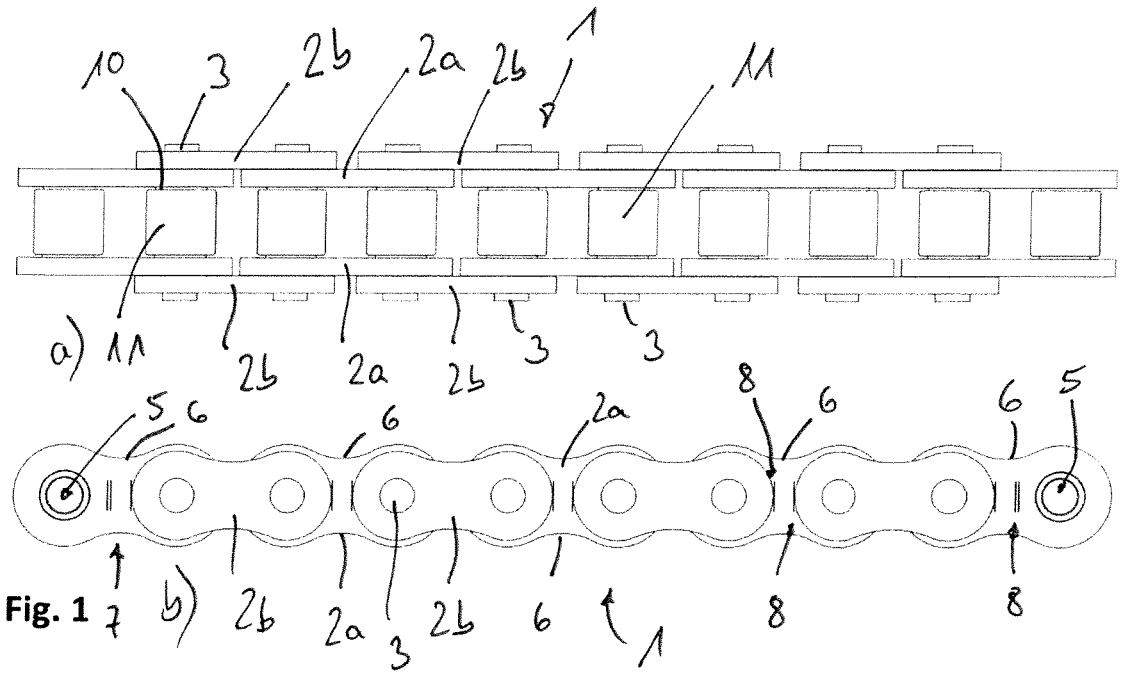
FIG. 1 an articulated chain in a top view (FIG. 1*a*) and in a side view (FIG. 1*b*), each in delivered condition.

FIG. 1, in the illustration marked a), shows a top view of an articulated chain 1 with link plates 2 and pins 3. Pertaining to link plates 2, a distinction can be made between inner link plates 2*a* and outer link plates 2*b*.

The example embodiment of articulated chain 1 depicted in FIG. 1 depicts a roller chain. The inner link plates 2*a* sit on a bushing 10 on the pin 3. Between the inner link plates 2*a*, there is a roller 11 on the bushing 10.

Each of the link plates 2 has two through-holes 5 for passage of the pin 3. The through-holes 5 extend between base areas 6 of the link plates 2. The through-holes 5 are spaced at a distance from one another in the link plates 2, whereby a necking 7 essentially in the middle of the link plate 2 is provided between the areas of the link plate 2 in which each through-hole 5 is located.

In the example embodiment depicted, the inner link plates 2*a* are formed slightly larger than the outer link plates 2*b* of the articulated chain 1.

The inner link plates 2*a* exhibit an outwardly oriented marker 8 on the base area 6. In the example embodiment depicted, the marker 8 exhibits four line-shaped depressions 9. The depressions 9 are exhibited in the outwardly oriented base area 6 of the inner link plates 2*a* by means of a stamping die. Two line-shaped depressions 9 each are allocated to each position of an outer contour of the outer link plate 2*b* adjacent to the inner link plate 2*a*.

It is to be gathered from FIG. 1 that the marker 8 is placed on the inner link plate 2*a* in such a way that the depression 9 that is farther away from the respective through-hole 5 corresponds to the position of the outer contour of the outer link plate 2*b* that characterizes the state of the articulated chain 1 as "new," that is, in the delivered condition. The outer contour of the outer link plate 2*b* lies on the depression 9 that is on the inside, in other words, spaced farther from the through-hole 5.

Due to wear of the articulated chain 1, or an elongation of the articulated chain 1, as a result of the load during operating hours, the through-holes 5 of a link plate 2 move apart. The distance of the pins 3 in an inner link plate 2*a* increases, so the distance of the adjacent outer link plates 2*b* increases. Thus, the outer contour of the outer link plate 2*b* moves away from the depression 9 of the marker 8 that is farther away from the through-hole 5 in the direction of the depression 9 that is closer to the through-hole 5. This is depicted in FIG. 2 in the side view for articulated chain 1.

Figure 2:
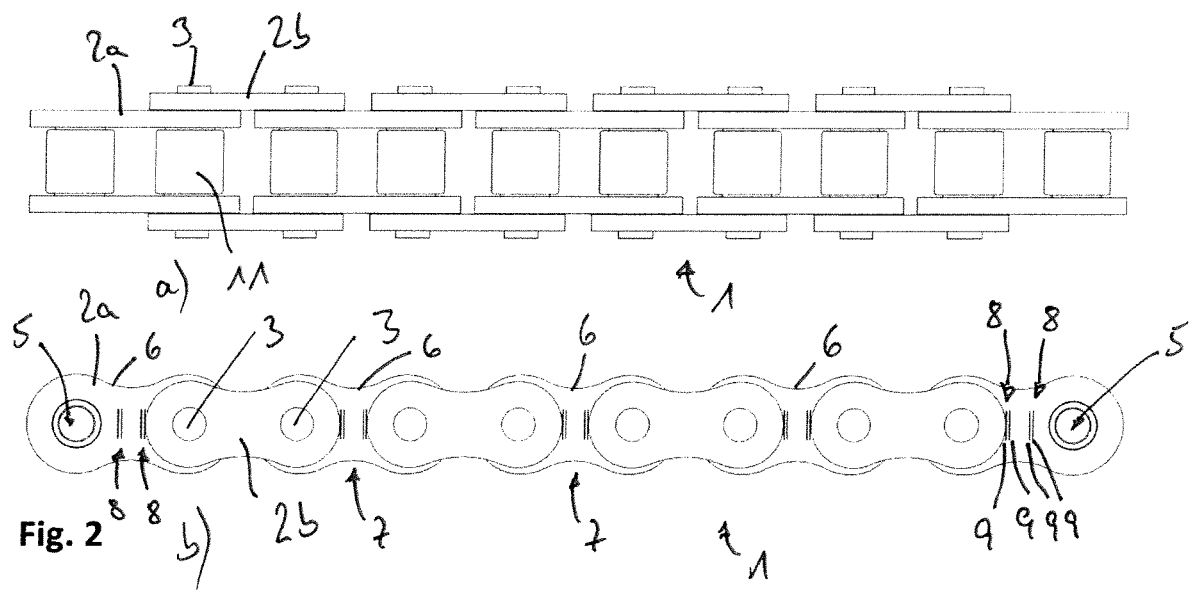
FIG. 2 the articulated chain corresponding to FIG. 1 in a top view (FIG. 2*a*) and in a side view (FIG. 2*b*), each in worn condition.

The depression 9 that is initially closer to the respective through-hole 5 and was not visible in the delivered condition in FIG. 1, becomes visible in the condition in which the articulated chain 1 exists as in FIG. 2. The articulated chain 1 has elongated.

It is also to be gathered from FIG. 2*a* that the chain links exhibit a greater distance between them than in the delivered condition depicted in FIG. 1. The distances between the depressions 9, which each correspond to a through-hole 5, that is, are located on one side of the necking 7, correspond to a distance, that is, one elongation per chain link, or one half of the elongation per chain link, that can compromise the functional capability of the articulated chain 1. Thus, the distance between the two depressions 9 that correspond to a through-hole 5, indicates a wear of the articulated chain 1 from which point the articulated chain 1 should be replaced. Through merely visual inspection of the articulated chain 1, the wear condition of the articulated chain 1 can be concluded.

Figure 3:
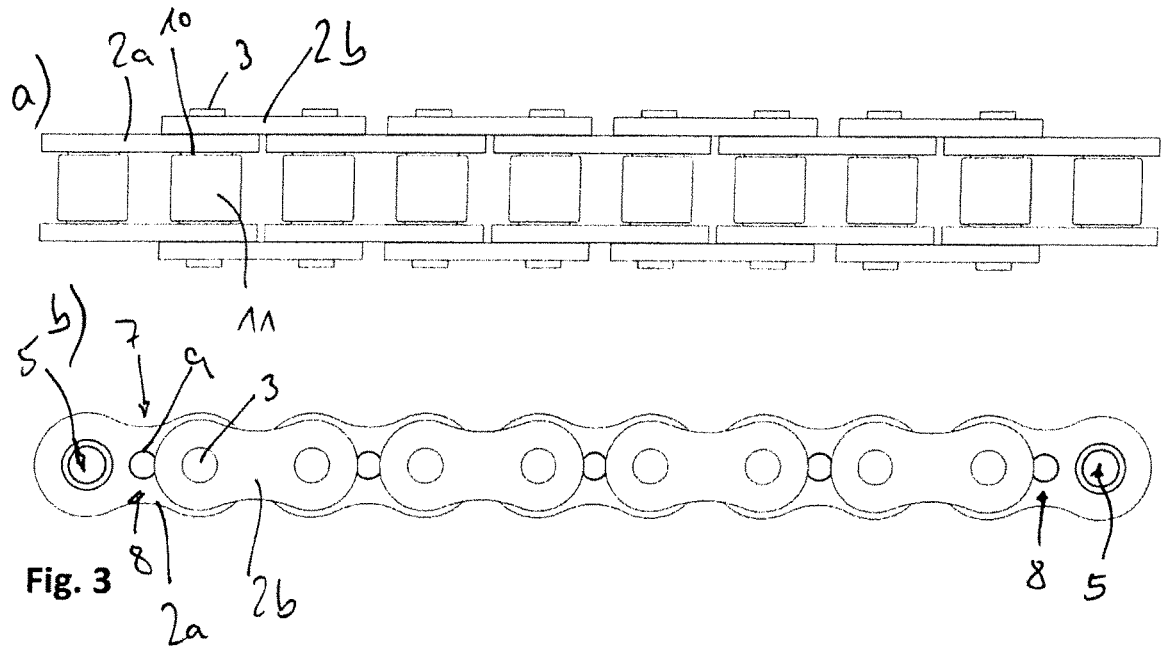
FIG. 3 another embodiment of an articulated chain in a top view (FIG. 3*a*) and in a side view (FIG. 3*b*), each in delivered condition.
Figure 4:
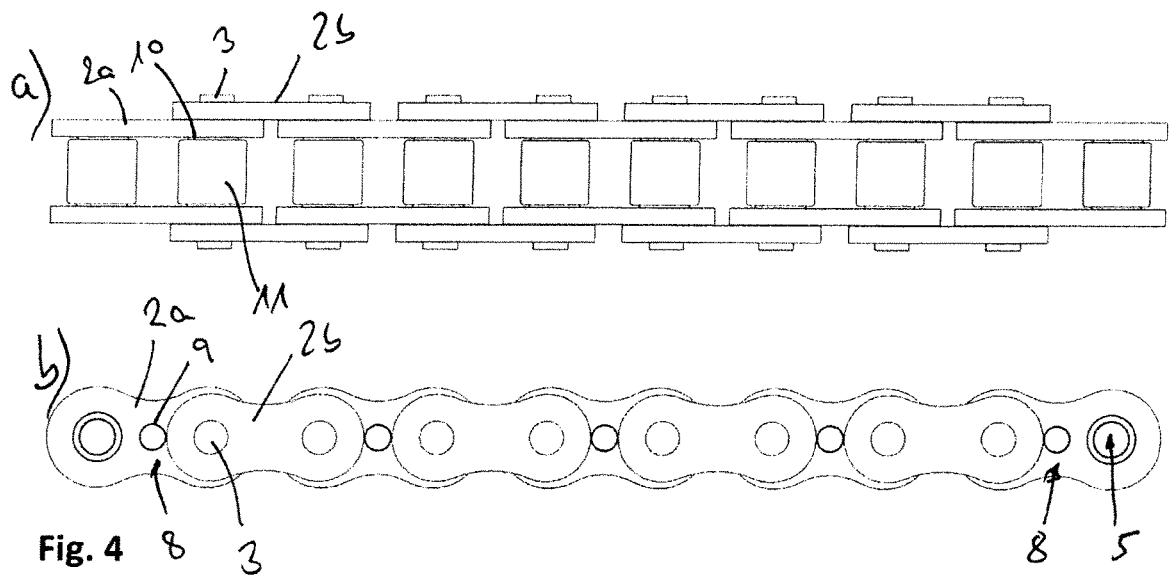
FIG. 4 the articulated chain corresponding to FIG. 3 in a top view (FIG. 4*a*) and in a side view (FIG. 4*b*), each in a worn condition.

FIGS. 3 and 4 show a further example embodiment of an articulated chain 1. For the sake of simplicity, identical elements of articulated chain 1 are given the same designation. The articulated chain 1 in the example embodiment of FIGS. 3 and 4 and the example embodiment of FIGS. 1 and 2 differs primarily in the different form or type of marker 8. In the example embodiment of FIGS. 3 and 4, the marker 8 is formed as a circular depression 9.

In the delivered condition, that is, in the "new" condition, which is shown in FIG. 3, the marker 8 is not fully visible. The sections of the circular depression 9 toward the through-holes 5 are covered by the outer link plates 2*b*. With increasing operating hours, the articulated chain 1 elongates, and the distance between the outer link plates 2*b* increases, as does the distance between the through-holes 5, so that the marker 8 in the form of the circular depression 9 can be seen in its entirety. The diameter of the circular depression 9 is specified such that when the depression 9, or the marker 8, is seen in its entirety, there is a distance between the outer link plates 2*b* that can be taken to denote wear. The "worn" condition of the articulated chain 1 is shown in FIG. 4.

Figure 5:
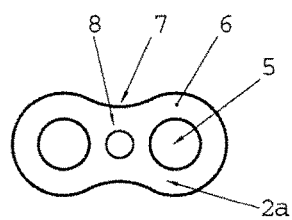
FIG. 5 a link plate of an articulated chain in a side view.

FIG. 5 shows a view of the base area 6 of a link plate 2*a* that corresponds to the example embodiment of the articulated chain 1 that is depicted in FIGS. 3 and 4. Between the through-holes 5, there is a mark 8 embodied as a circular depression 9 on the base area 6. The outer diameter of the depression 9 corresponds to the distance between two adjacent outer link plates 2*b* when the articulated chain 1 is considered worn. While the marker 8 cannot be perceived visually in its entirety when in the delivered condition because the border of the marker 8 is covered by the outer plates 2*b*, the marker 8 can be perceived visually in its entirety when the distance between the outer plates 2*b* has increased to the worn condition.

The invention claimed is:

1. A link plate of a pin chain, bush chain, or roller chain, wherein the link plate has two through-holes for one pin each, the through-holes formed between two base areas of the link plate, and a distance-indicating marker applied to at least one base area;
    wherein said distance-indicating marker comprises at least one reference point by means of which a position of an outer tab and/or position of an outer contour of the outer tab can be compared; and
    wherein the distance-indicating marking is configured as a depression formed in the at least one base area, wherein the depression is spaced from the through holes.

2. A link plate according to claim 1 wherein the distance-indicating marker indicates a distance in the longitudinal dimension of the base area.

3. A link plate according to claim 1, wherein the link plate has a necking, and the marker has at least two points on opposite sides of the necking.

4. A link plate according to claim 1, wherein the marker forms a closed geometric shape.

5. An articulated chain comprising inner and outer link plates, wherein at least one inner link plate has two through-holes for one pin each, the through-holes formed between two base areas of the at least one inner link plate, and a distance-indicating marker applied to at least one base area, wherein said distance-indicating marker comprises at least one reference point by means of which a position and/or position of an outer contour of an outer tab can be compared, wherein the distance-indicating marking is configured as a depression formed in a surface of the at least one base area and directed outwards towards said outer link plate, and wherein the depression is spaced from the through holes.

6. An articulated chain according to claim 5, wherein the marker is visible depending on a wear level of the chain.

7. A method of detecting wear of an articulated chain that has link plates with two through-holes for one pin each, the through-holes formed between two link plate base areas, comprising:
    providing at least one of the link plates as a link plate that has a distance-indicating marker applied to at least one said base area, wherein said distance-indicating marker comprises at least one reference point, by means of which a position of an outer tab and/or position of an outer contour of the outer tab is compared, and wherein the distance-indicating marking is formed as a depression in the at least one base area, and wherein the depression is spaced from the through holes.

8. A method according to claim 7, wherein the distance-indicating marker indicates a distance in the longitudinal dimension of the base area.

9. A link plate according to claim 1, wherein the marker is configured as a curved depression.

10. A link plate according to claim 9, wherein the curved depression is a circular depression.

11. A link plate according to claim 1, wherein the marker is configured as one or more line-shaped depressions transverse to the longitudinal axis of the link plate.

12. An articulated chain according to claim 5, wherein said chain is one of a pin chain, bush chain, and roller chain.

* * * * *